(12) United States Patent
Rassman, Jr. et al.

(10) Patent No.: US 6,390,736 B2
(45) Date of Patent: May 21, 2002

(54) DESICCANT FEEDER SYSTEM AND APPARATUS

(75) Inventors: Joseph T. Rassman, Jr., Lyndell; Kirt C. Weidner, Exton; Alan S. Geckle, Downingtown, all of PA (US)

(73) Assignee: Omega Design Corpoation, Lionville, PA (US)

( * ) Notice: Subject to any disclaimer, the term of this patent is extended or adjusted under 35 U.S.C. 154(b) by 0 days.

(21) Appl. No.: 09/833,272

(22) Filed: Apr. 12, 2001

Related U.S. Application Data

(62) Division of application No. 09/433,251, filed on Nov. 4, 1999, now Pat. No. 6,261,030.
(60) Provisional application No. 60/107,671, filed on Nov. 5, 1998.

(51) Int. Cl.[7] .............................................. B65G 51/30
(52) U.S. Cl. ....................... 406/180; 406/177; 406/74; 406/28
(58) Field of Search ......................... 406/28, 177, 180, 406/74

(56) References Cited

U.S. PATENT DOCUMENTS

| 3,888,285 | A | * | 6/1975 | Ashton | 141/101 |
|---|---|---|---|---|---|
| 4,577,451 | A | * | 3/1986 | Salicini | 53/58 |
| 4,655,338 | A | * | 4/1987 | Hershey et al. | 198/395 |
| 5,421,447 | A | * | 6/1995 | Ruth et al. | 198/377 |
| 5,626,000 | A | * | 5/1997 | Edwards et al. | 53/281 |
| 5,660,506 | A | * | 8/1997 | Berge et al. | 406/3 |
| 5,661,949 | A | * | 9/1997 | Blanc | 53/237 |
| 5,740,843 | A | * | 4/1998 | Burkart | 141/79 |
| 5,799,468 | A | * | 9/1998 | Eck et al. | 53/453 |

* cited by examiner

Primary Examiner—Christopher P. Ellis
Assistant Examiner—Joe Dillon, Jr.
(74) Attorney, Agent, or Firm—Eugene E. Renz, Jr.

(57) ABSTRACT

A desiccant feeder system comprising, a reservoir for desiccant canisters, means for delivering the canisters through a transfer tube to at a loading station, means for presenting the open end of containers one at a time at the loading station, means for circulating air at high velocity through the tubing including an adjustable internal ring-shaped nozzle to deliver desiccant canisters from the reservoir to the loading station, and a shuttle selectively actuatable to discharge at least one desiccant cannister to the containers at the loading station.

3 Claims, 8 Drawing Sheets

DESICCANT FEEDER SYSTEM AND APPARATUS

This application is a divisional application of U.S. patent application Ser. No. 09/433,251, filed Nov. 4, 1999 since patented as U.S. Pat. No. 6,261,030, which claims the benefit of U.S. Provisional Application No. 60/107,671 filed Nov. 5, 1998.

FIELD OF THE INVENTION

The present invention relates to improvements in desiccant feeder systems and apparatus.

BACKGROUND OF THE INVENTION

The prior art patents listed below show bottle unscrambling systems and apparatus. However, these patent do not teach or suggest the desiccant feeding system and apparatus of the present invention.

Omega Design Corp. U.S. Pat. No. 5,421,447

HIGH RATE TRANSFER WHEEL FOR ORIENTING UNSCRAMBLED CONTAINERS

Issued: Jun. 6, 1995 and

Omega Design Corp. U.S. Pat. No. 4,655,338

BOTTLE UNSCRAMBLER

Issued: Apr. 7, 1987

SUMMARY OF THE INVENTION

The canister desiccant feeder of the present invention has seven areas to be monitored for optimum machine performance. They are reservoir hopper, pre-orienter, air transfer device, desiccant shuttle system, container handling system, verification system, rejection station and discharge conveyor.

The hopper supplies desiccant by gravity feed through a "stopper" valve at the bottom of the reservoir. The stopper valve is actuated by a connecting rod and lever attached to an air cylinder outboard of the reservoir. The stopper is cycled open and closed when the pre-orienter requires desiccants. The cycle time and the movement of the stopper should not require adjustments during normal operation.

The pre-orienter begins the orienting process by forming a single column of desiccants and transferring the column to the air transfer device. A sensor called the pre-orienter sensor controls the quantity of desiccants in the pre-orienter. This sensor signals the stopper valve to open and close, hence delivering desiccants to the pre-orienter. The level of desiccants directly affects the overall operating efficiency of the pre-orienter.

Sorter discs are used to form a groove or trough in which the desiccants are columnized. Sorter discs are exchanged at changeovers to form different size grooves for different size/shape desiccants. Air jets are used to help position the desiccants properly in the sorter disc's groove.

The air transfer device for the present invention transports the oriented desiccants from the pre-orienter to the shuttle. The air transfer device utilizes compressed air to transfer the desiccants. Upon the exit from the pre-orienter a reducer is coupled to an air amplifier, which is connected to a discharge tube and the desiccant transfer tubing. Slots milled into the tubing regulate the fill height of the desiccants to a determined height and once the slots are blocked then the back pressure in the tubing will not allow the transfer of any more desiccants. A sensor is mounted to confirm the presence of desiccants within the tube. If the eye acknowledges absence of desiccants, then the container handling system is stopped.

The desiccant shuttle system consists of a main housing (top and bottom block), a linear electronic solenoid, a spring and a desiccant transfer block. The desiccants are supplied to the shuttle by the aforementioned transfer device and then are available for dispensing. The shuttle is in a non-active (retracted) state and the proper quantity of desiccants are stopped by a ridge on the bottom block and allowed to stack. The desiccants will remain in this configuration until activation. The activation is provided through a gate eye sensor, which signals the linear solenoid to activate. Desiccants are then moved within the transfer block to a position where the desiccants can exit the transfer block into the bottle below. Exit from the transfer block is assisted by an air nozzle to achieve higher speed. The transfer block is maintained in its extended position for a determined period of time. Next, the linear solenoid is deactivated and a spring returns the transfer block to its original position.

Desiccants are dispensed into the bottles at a predetermined speed which is dependent upon the neck of the bottle. In accordance with the verification system of the present invention, the eye verifies if a desiccant has been inserted into the bottle. The eye is mounted under the bottle in the container handling system and senses through the bottle for the desiccant. The system also includes a leading edge eye sensor and a trailing edge eye sensor. The leading edge eye determines when a bottle is entering the verification area and the trailing edge eye determines when it is leaving the area. If a desiccant is not detected, then the bottle is rejected at the rejection station. The rejection station rejects the bottle via an air jet into a bin.

In accordance with the discharge conveyor of the present invention, the discharge conveyor's tabletop chain speed should be adjusted to provide a smooth transfer of containers through the system. A sensor called the backlog sensor monitors the conveyor discharge conditions at the edge of the canister desiccant feeder. Should the conveyor backlog or overload, the backlog sensor will signal the entire canister desiccant feeder to pause. Once the blockage has cleared, the machine will automatically restart. Minor adjustments to the timer settings of the sensor may be required to compensate for actual in-plant operations, conveyor velocities and container sizes and shapes.

The system of the present invention has many features. They include the fact that the system may be mounted on an adjustable free-standing mobile frame which can be easily moved into and over existing conveyor systems. The system is fully automatic and provides on demand operation with discharge backlog detection. The system is adaptable to a ten gallon unit mounted floor-level hopper with vertical elevator to minimize floor space requirements. The system is provided with a desiccant drop verification and is fully guarded with interlocks. The system does not require changing the parts for different sized bottles or containers and provides positive container control through variable speed side belts with shaft encoder to track container speeds. The system and apparatus of the present invention also has a container reject for missing desiccant with reject verification.

BRIEF DESCRIPTION OF THE DRAWINGS

These and other objects of the present invention and various features and details of the operation and construction thereof are hereinafter more fully set forth with reference to the accompanying drawings, wherein.

DESCRIPTION OF THE PREFERRED EMBODIMENTS

Figure 1:
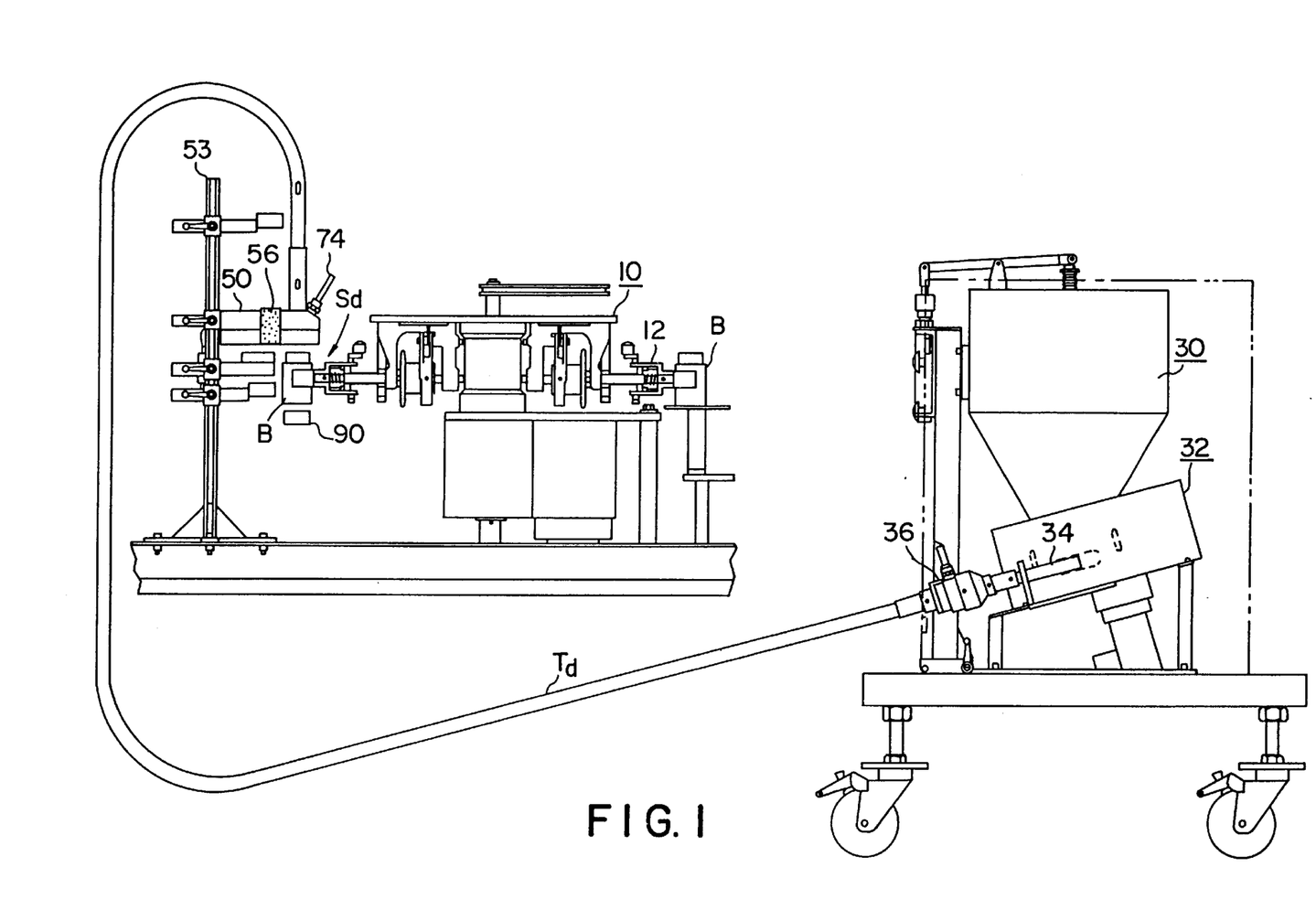
FIG. 1 is a schematic side elevational view showing a system for delivering a continuous stream of desiccant canisters to a shuttle system, the shuttle discharging single or multiple desiccant canisters into individual containers carried at high speed on a bottle unscrambling turret.
Figures 2, 2A:
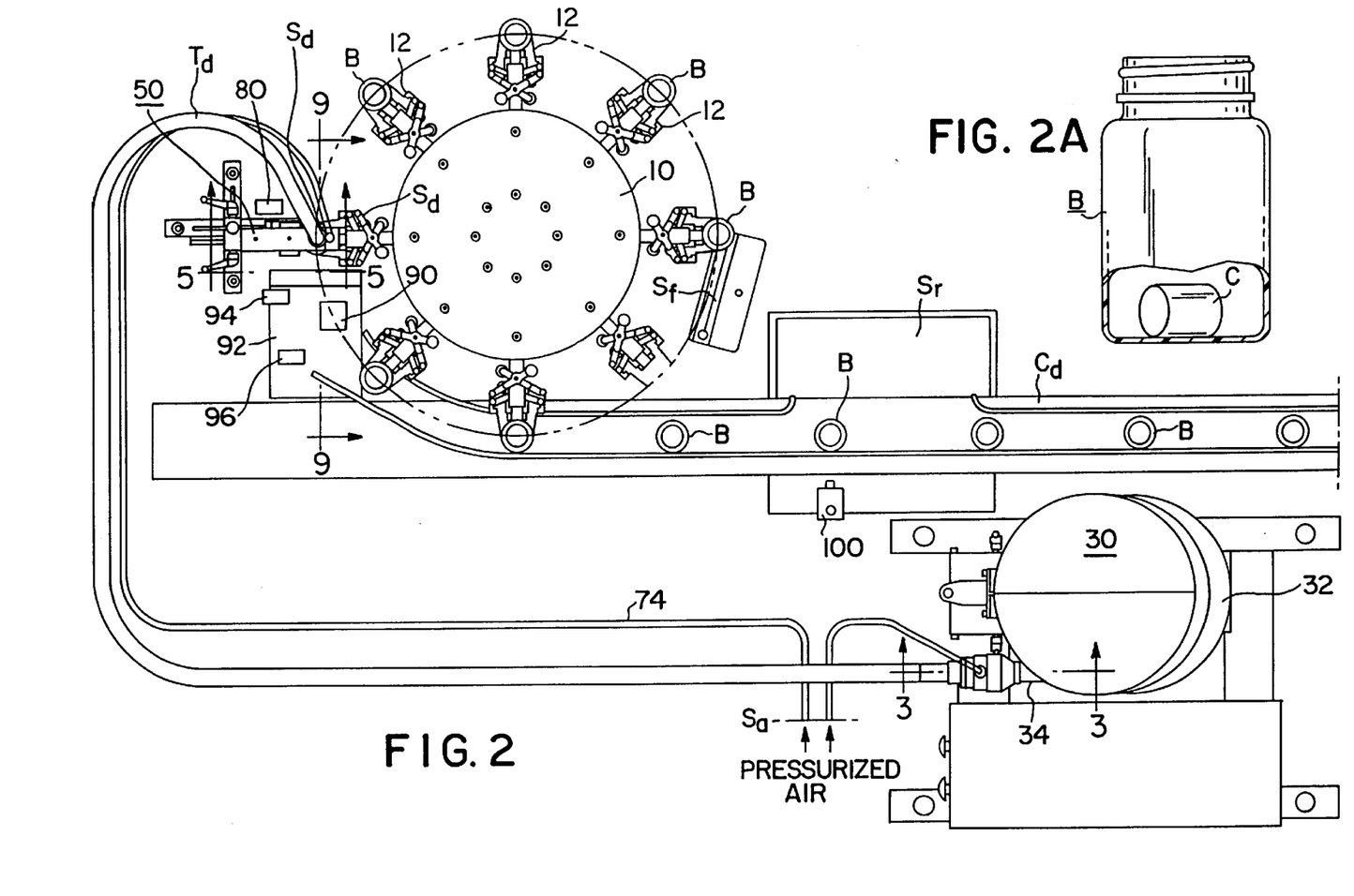
FIG. 2 is a schematic plan view of FIG. 1 showing the desiccant reservoir and pre-orienter, air transfer device, desiccant transfer tubing, shuttle assembly, bottle unscrambling turret, conveyor, rejection station and sensor locations.
FIG. 2A is a side elevational view partially in section showing a typical bottle having a desiccant canister contained therein.

Referring now to the drawings and particularly to FIGS. 1 and 2 thereof, there is shown a system and apparatus for delivering desiccant canisters (C) and depositing predetermined preselected canisters in a container or bottle (B) in a continuous assembly line fashion. The desiccant feeding and loading system is shown in association with a bottle unscrambler, generally of the type shown in U.S. Pat. No. 4,655,338 entitled, BOTTLE UNSCRAMBLER, which issued Apr. 7, 1987 and is owned by Omega Design Corp., assignee of the present application. The bottle orienting system comprises a rotating turret (10) having a plurality of pocket assemblies (12) disposed at equi-spaced locations circumferentially around the turret (10). The bottles (B) are fed into a feeding station ($S_f$) in either a top down or top up condition and as they are rotated by the turret (10), they are oriented to a top up position at a desiccant feeding and loading station ($S_d$) where desiccant canisters (C) are discharged, for example, one to a bottle (B) and then delivered to a discharge conveyor ($C_d$).

The basic elements of the desiccant feeder system include a reservoir (30) wherein desiccant canisters (C) are fed in random fashion and are delivered to a pre-orienter (32) which orients the canisters (C) single file, end to end, for delivery to an infeed tube (34) of an air transfer device (36). The air transfer device (36) releases a predetermined amount of compressed air at high velocity through an internal ring-shape nozzle to drive the desiccant canisters (C) through desiccant transfer tubing ($T_d$) connecting the air transfer device (36) to a desiccant shuttle assembly (50) at the desiccant feeding and loading station ($S_d$). As explained in more detail hereafter, the air released through the nozzle creates a strong vacuum drawing additional ambient air through the infeed tube (34) and pulling additional surrounding air through the rear of the air transfer device while pushing the ambient air in front. This creates a very efficient delivery system at relatively low air pressures, in the order of 10 psi.

Figures 5, 6, 7:
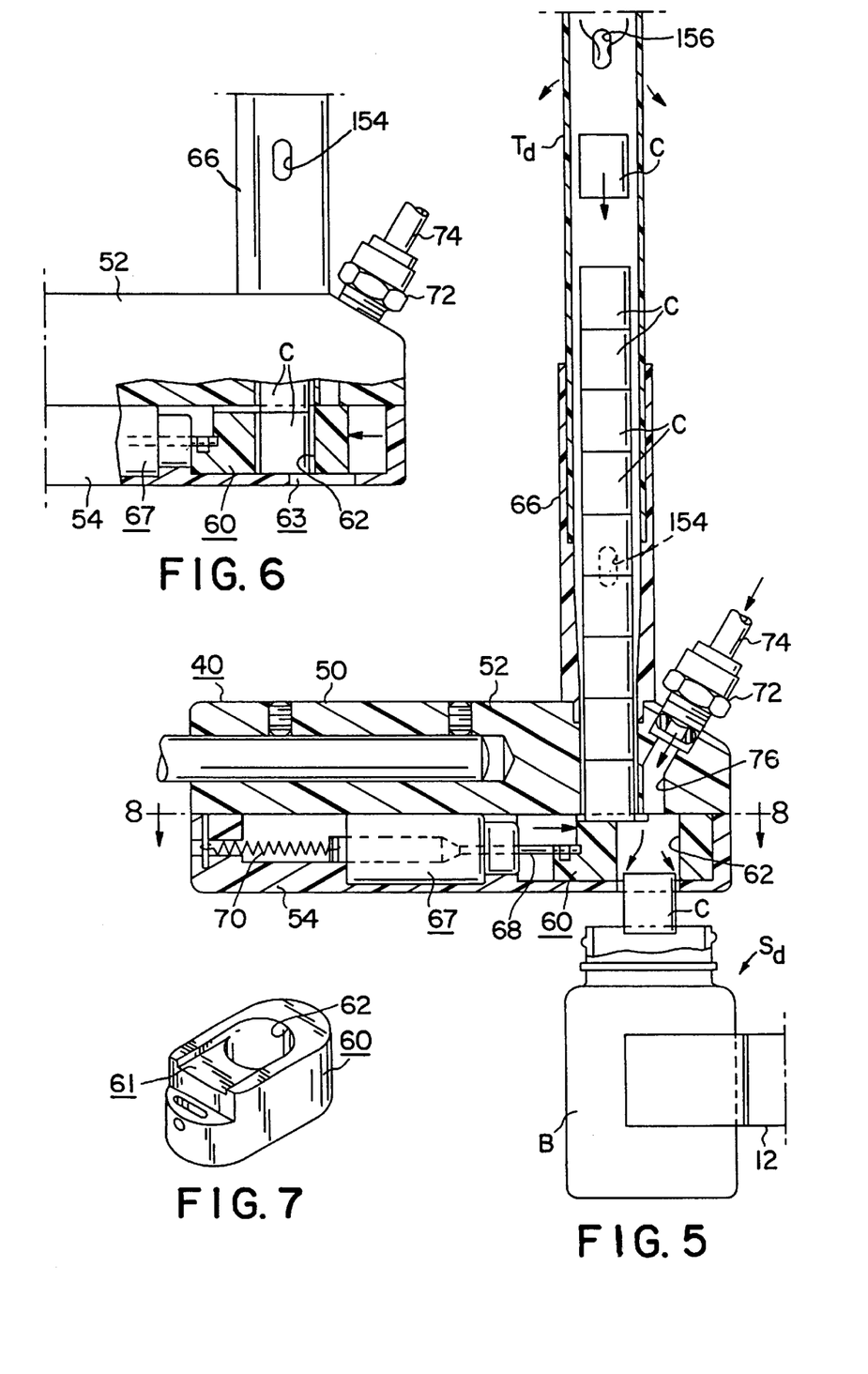
FIG. 5 is a fragmentary side elevational sectional view taken on the line 5,5 of FIG. 2 showing details of the shuttle assembly with its shuttle block in the forward or desiccant discharge position.
FIG. 6 is a fragmentary side elevational view similar to FIG. 5 showing the shuttle block in the retracted or desiccant loading position.
FIG. 7 is an isometric view of the shuttle original slide-design.
Figure 8:
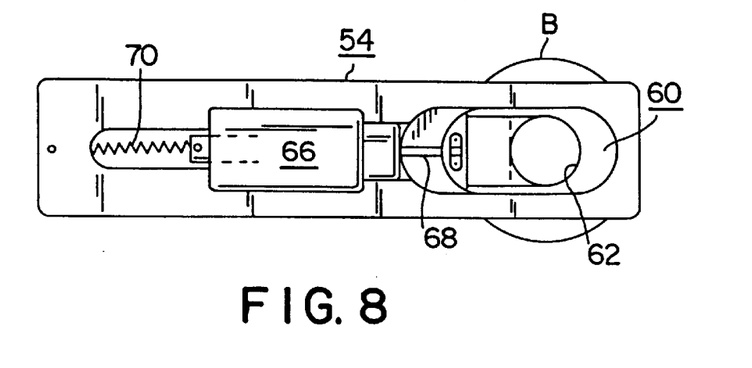
FIG. 8 is a sectional plan view taken on the line 8,8 of FIG. 5 showing additional details of the shuttle assembly.

The desiccant delivery station ($S_d$), as best illustrated in FIGS. 1 and 5 includes a shuttle assembly (50), which in the present instance, is mounted on an upstanding support frame (53) so that it may be selectively adjusted in a vertical direction for ease of aligning the shuttle assembly (50) with respect to the bottle unscrambler turret (10). The shuttle assembly (50) is of relatively simplified construction and comprises a top block (52) and a bottom block (54) which are held in assembled relation by a draw latch (56). A shuttle slide (60) having a discharge opening (62) is mounted for sliding movement in the shuttle bottom block (54) between a first limit or rest position (FIG. 6) blocking flow of desiccant canisters (C) through the discharge opening (63) in the shuttle bottom block (54). In this position, the discharge opening (62) is aligned with the stack of desiccants in the accumulator tube (66). A second discharge limit position (FIG. 5) wherein the discharge opening (62) is aligned with the opening in the bottom block (63), thus permitting discharge of a single canister (C) to a bottle (B). The shuttle slide (60) is cycled between the limit positions by a spring biased solenoid (67) having a rod (68) connected to the shuttle slide (60) and a conventional extension spring (70) normally biasing the shuttle slide (60) to its second blocking limit position (FIG. 6). When the solenoid is energized, it moves the shuttle slide (60) to the discharge limit position (FIG. 5). The shuttle top block (52) mounts a fitting (72) connected through a line (74) to the pressurized air supply to direct air through an internal channel (76) and propel desiccant canisters (C) directly into the bottle (B) in the manner shown in FIG. 5.

The shuttle slide (60) has an entrance ramp (61) cut below the level of the top of the discharge opening (62) so that as the shuttle slide (60) is moved to its first limit position, the desiccant canisters (C) in the stack rest on the ramp and ensure the release of a predetermined number of canisters (C) in the manner shown and described.

Conventional sensors operatively connected to various components of the system are provided for synchronizing the feed and delivery of the desiccants to the open containers as they are moved at a constant speed through the desiccant discharge and feeding station ($S_d$). To this end, a so-called gate sensor (80) is disposed in the path of the pocket assemblies and is operatively connected to the shuttle slide (60), solenoid (67) so that if it senses a pocket assembly coming into the station as having a bottle (B), then it activates the solenoid (67) to cycle the shuttle slide (60) to feed a desiccant canister (C) to the bottle (B). If the pocket assembly entering the station is not loaded with a bottle (B), the gate eye sensor (80) does not activate the solenoid (67).

Figure 9:
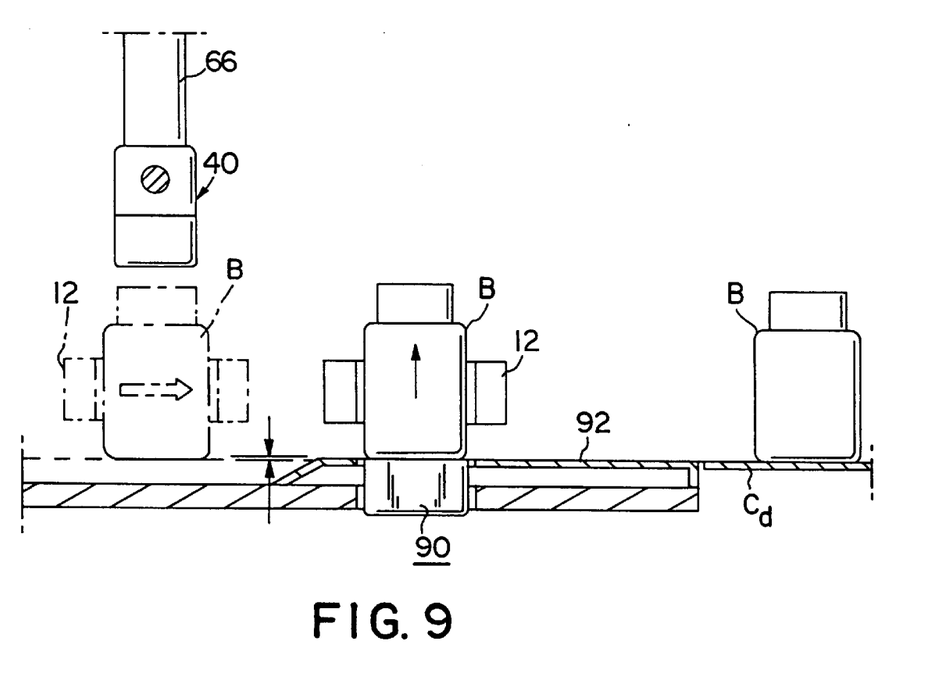
FIG. 9 is a schematic side elevational sectional view taken on the line 9,9 of FIG. 2 showing how the bottles carried in the pocket assemblies of the bottle unscrambler have their bottom faces all raised to a common plane by means of a ramp prior to passing over a sensor so that the presence of a desiccant canister in each bottle may be determined.

Downstream of the desiccant loading and feeding station ($S_d$) is a verification sensor (90) which is mounted in an upwardly inclined ramp (92). The leading edge sensor (94) and trailing edge sensor (96) in cooperation with the verification sensor (90) are operatively connected to a reject mechanism (100) so that bottles (B) passing through the station without a desiccant canister (C) are discharged from the conveyor at the rejection station ($S_r$).

In some instances, it is desired to feed two desiccant canisters (C) to each bottle (B). In this instance, the system can be easily modified to accommodate feeding two at a time. The shuttle block bottom assembly is simply removed and replaced with one wherein the shuttle slide (60) has a discharge opening twice the height of a desiccant canister. To do this, the draw latch and hinge are simply disengaged. Then, the new bottom block assembly can be mounted and in all other respects operates the same as in the manner described above.

Figure 3:
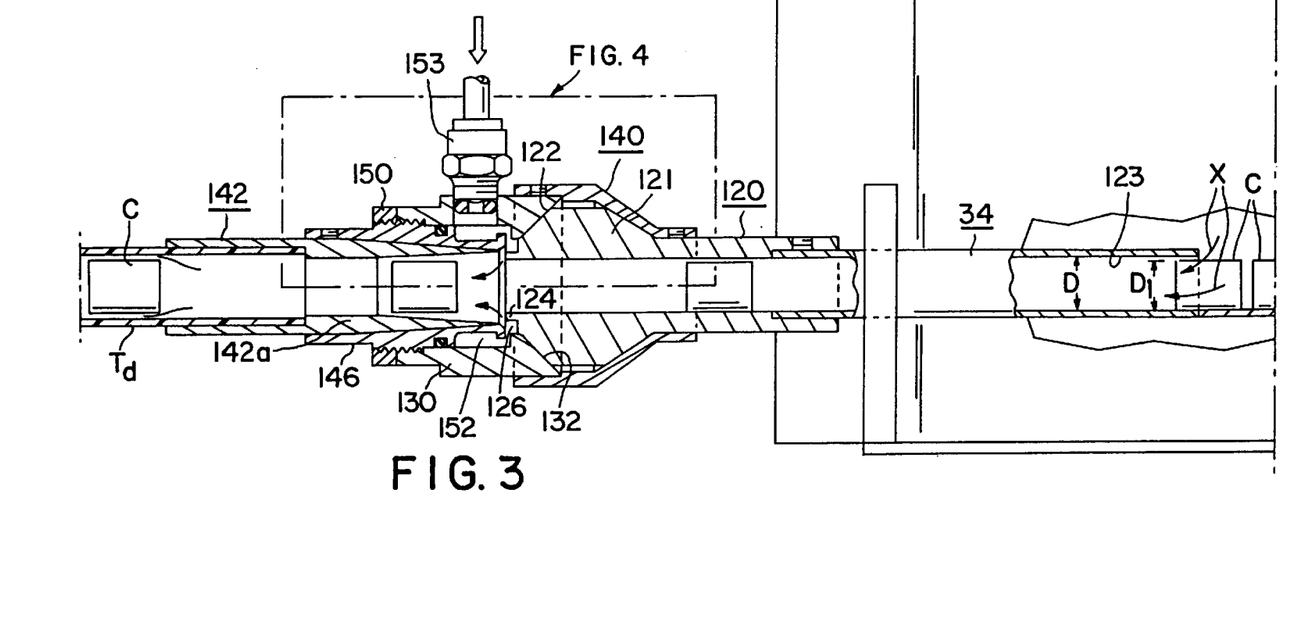
FIG. 3 is an enlarged fragmentary sectional side elevational view taken on the line 3,3 of FIG. 2 showing details of the air transfer device and a portion of the pre-orienter.
Figure 4:
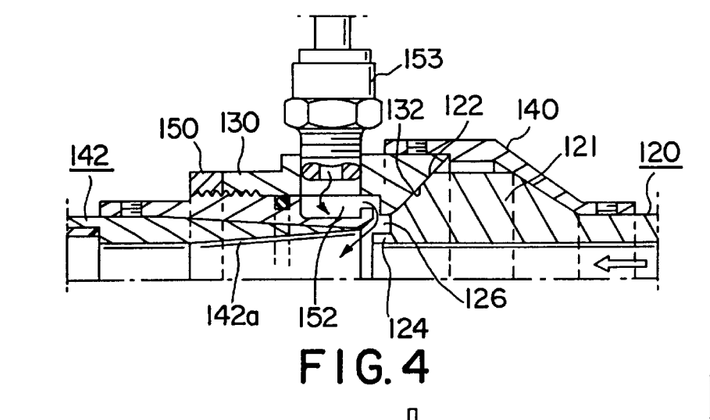
FIG. 4 is an enlarged fragmentary side elevational view of the detail contained within the dot and dash line shown in FIG. 3 and designated in FIG. 4.

Considering now the air transfer assembly, the construction and details thereof are best shown in FIGS. 3 and 4. As shown therein, air transfer assembly comprises an air amplifier infeed tube (120) having a central bore (123) of a diameter (D) slightly larger than the diameter ($D_1$) of the desiccant canisters (C) and has an enlarged inner end (121) terminating at a circumferentially extending frusto-conical face (122) which is stepped as at 124 at it inner terminal end to define a circumferentially extending air inlet chamber (126). The assembly further includes an elongated tubular air amplifier throat member (130) having a frusto-conical face (132) complementing and confronting the frusto-conical face (122) of the air amplifier infeed tube. The air amplifier throat member (130) and air amplifier infeed tube (120) are held in the abutting relationship shown in FIG. 3 by a nozzle reducer (140). The assembly further includes an amplifier discharge tube (142) having an outwardly diverging flared inner face ($142_a$) adjacent its inner end which confronts the air amplifier infeed tube (120) and which serves as a pilot section directing the desiccant canisters (C) to the discharge tube in the manner shown in FIG. 3. An intermediate sleeve (146) is mounted on the inner end of the amplifier discharge tube (142) and has external threads which mate with threads on the air amplifier throat (130).

A nut (150) is used to secure the parts in place in the manner shown in FIG. 3. The sleeve (146) has a annular undercut at its inner end defining an air chamber (152). A fitting (153) connects the air chamber (152) to a pressurized air supply ($S_a$). The flexible tube ($T_d$) as illustrated is connected at its inner end to the air amplifier discharge tube (142). As shown by the arrows, pressurized air from a source enters the fitting and flows into the annular chamber (152) and from there the air is directed inwardly through the annular chamber (124) to the bore of the amplifier discharge tube. This arrangement creates a vacuum, thereby pulling additional air from the ambient environment through the amplifier infeed tube (34) as shown by the arrows designated X.

Consider briefly, the operation of the system and apparatus as described. Desiccant canisters (C) flow from the reservoir (30) to the pre-orienter (32) and into the amplifier infeed tube (34) where they arrive in an end to end configuration. This tube as shown has a diameter slightly larger than the diameter of the canisters (C) so that they accumulate in the air infeed tube in an end to end array. Pressurized air drives the canisters (C) through the desiccant transfer tubing ($T_d$) and deliver the canisters (C) to the accumulator tube (66) at the desiccant loading station ($S_d$). An opening is provided in the tubing and accumulation tube at points 154 and 156 (as shown in FIG. 5). The transfer assembly will continue to automatically feed desiccant canisters (C) through the system until the supply of desiccant canisters in the accumulator tube (66) reaches the upper limit at 156. At such point, back pressure within the transfer tubing ($T_d$) will prevent the transfer of desiccants. When the level of desiccant canister (C) falls below the lower limit (154), the bottle handling machine is stopped. If this condition lasts longer than the predetermined time, an alarm is triggered. The tubing is preferably of a fluorinated ethylene propylene (FEP) which is available under the trade name Chemfluor.

Figure 10:
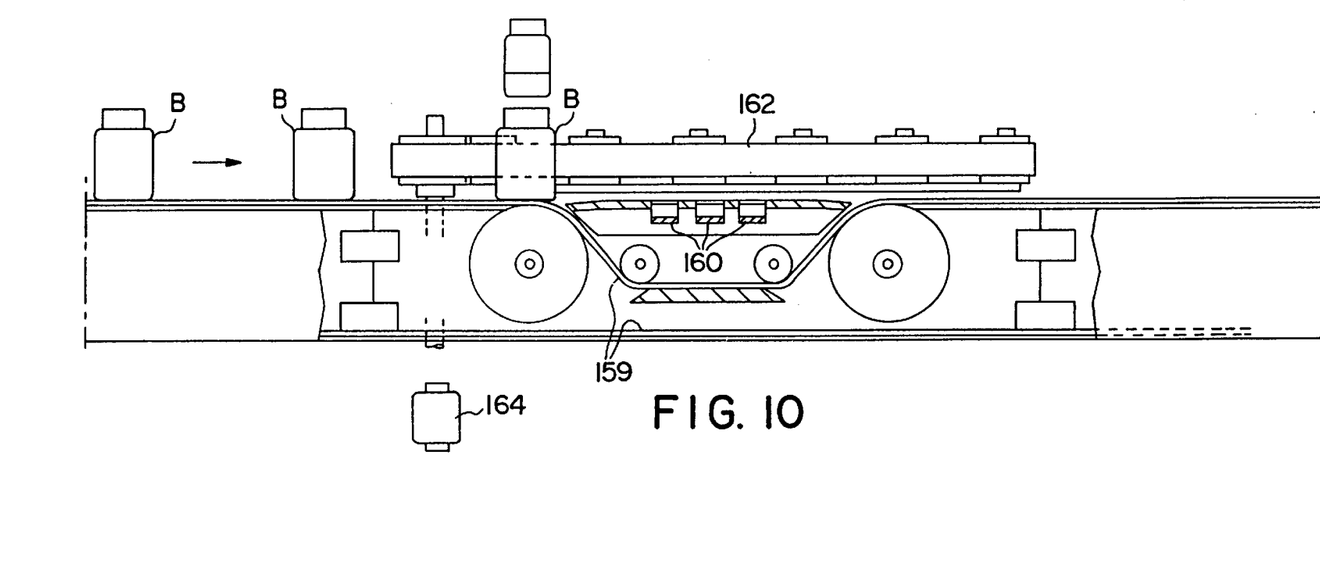
FIG. 10 is a schematic fragmentary side elevational view showing a conveyor modification wherein a portion is broken away and in section to show certain details of construction.
Figure 11:
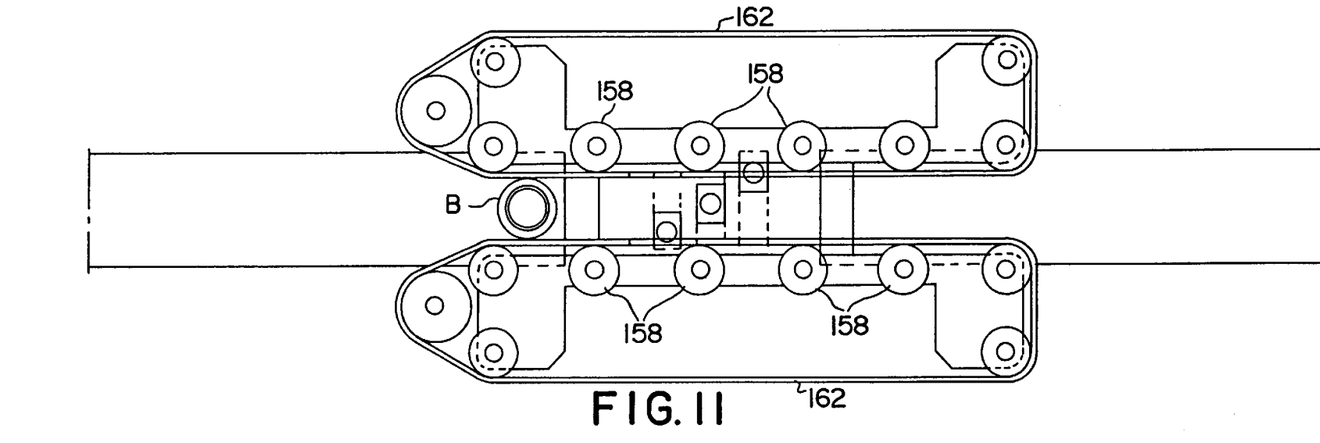
FIG. 11 is a plan view of FIG. 10.
Figure 12A:
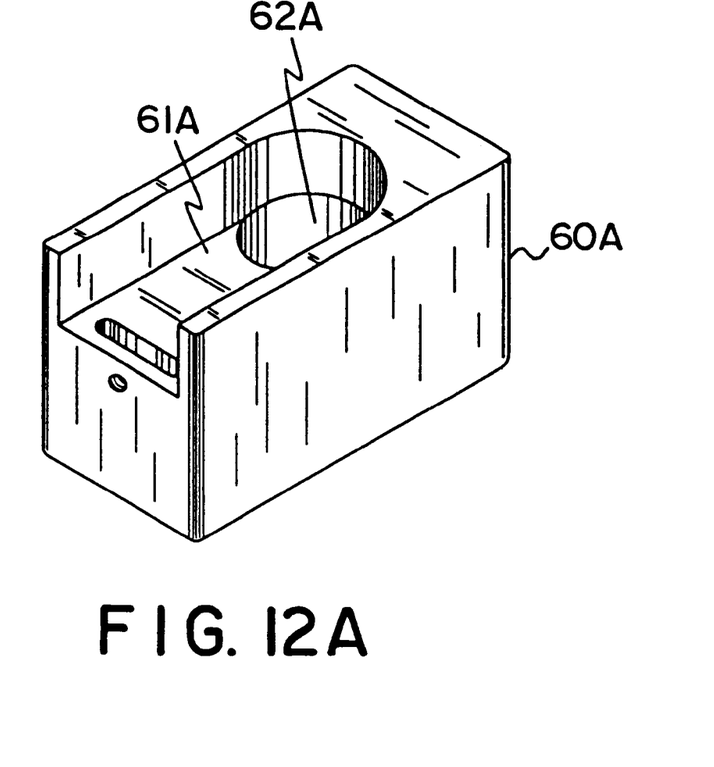
FIG. 12a is a perspective view of a shuttle modification in accordance with the present invention.
Figure 12B:
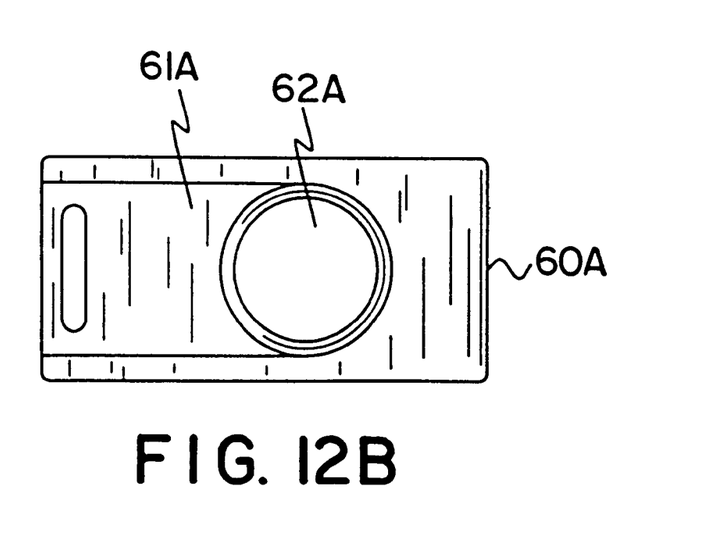
FIG. 12b is a top plan view of the modified shuttle slide.
Figure 13A:
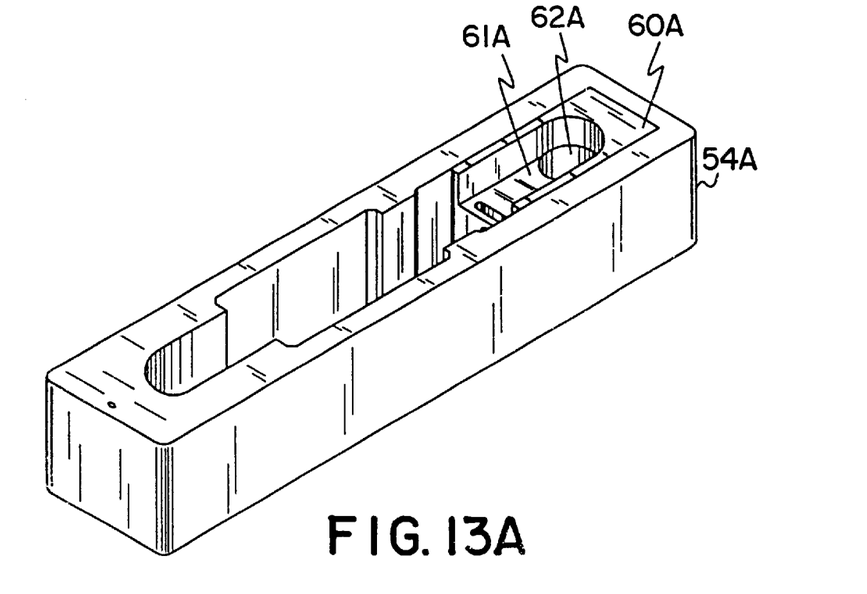
FIG. 13a is a perspective view of a modified shuttle bottom block.
Figure 13B:
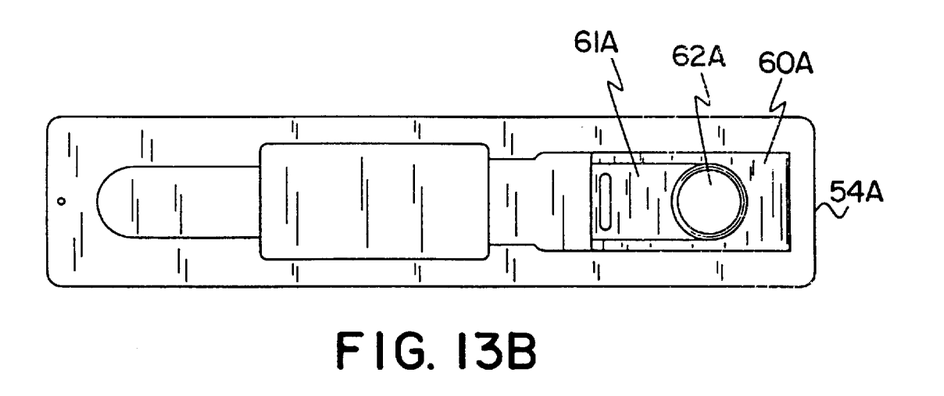
FIG. 13b is a top plan view of the shuttle block.

There is shown in FIGS. 10 and 11 a conveyor modification where it may be desired to locate the desiccant feeding and loading system of the present invention along the path of a conveyor rather than in association with the bottle unscrambler as described above. In this instance, the downflex conveyor section shown in FIGS. 10 and 11 is simply placed in the location desired for sensing bottles (B) and the desiccant loading station is appropriately positioned upstream of the downflex conveyor section. As illustrated, the conveyor belt (159) is diverted downwardly by a suitable modification and three sensors (160) are located across the width of the conveyor for sensing whether bottles (B) moving through this section of the conveyor are filled with the appropriate desiccant canister. The drive system for moving bottles (B) through the sensor station includes a series of rollers (158) and belts (159) and a suitable drive motor (164) for advancing the bottles (B) moving on the conveyor in the direction indicated through the sensing station.

It is shown in FIGS. 12a–13b, inclusive, a modified form of shuttle assembly in accordance with the present invention which is generally similar in construction of the arrangement to that described previously except the slide is generally rectangular rather than rounded at its front and rear end. Accordingly, similar reference numerals have been assigned with the subscript "A".

It has been found that this form of the shuttle assembly is easier and more economical to manufacture.

Even though particular embodiments of the present invention have been illustrated and described herein, it is not intended to limit the invention and changes and modifications may be made therein within the scope of the following claims.

What is claimed is:

1. A shuttle assembly comprising of a shuttle top block and a bottom block held in assembled relation by a draw latch, a shuttle slide mounted for sliding movement in the shuttle bottom block between a first limit position blocking pneumatic flow of desiccant canisters through a discharge opening in the shuttle bottom block and a second limit position wherein the discharge opening is aligned with the opening in the bottom block to permit discharge of a predetermined number of desiccant canisters to a container aligned with the discharge opening.

2. A shuttle assembly as claimed in claim 1, wherein the shuttle slide is cycled between limit positions by a spring bias solenoid.

3. A shuttle assembly as claimed in claim 1, wherein said shuttle slide comprises as an entrance ramp located below the level of the top of a discharge opening of said shuttle slide so as the shuttle slide moves to its first limit position, desiccant canisters in a stack rest on the ramp and ensure the release of the predetermined number of canisters when the shuttle slide is activated to its second limit position.

* * * * *